Feb. 19, 1963 L. J. TUMMERS ET AL 3,078,195

TRANSISTOR

Filed March 23, 1955

INVENTORS
LEONARD JOHAN TUMMERS
PIETER WILLEM HAAYMAN

BY Fred M. Vogel
AGENT

United States Patent Office 3,078,195

Patented Feb. 19, 1963

3,078,195

TRANSISTOR

Leonard Johan Tummers and Pieter Willem Haayman, Eindhoven, Netherlands, assignors, by mesne assignments, to North American Philips Company, Inc., New York, N.Y., a corporation of Delaware Filed Mar. 23, 1955, Ser. No. 496,278

Claims priority, application Netherlands Feb. 27, 1954

9 Claims. (Cl. 148—33)

The invention relates to a transistor and in particular to a transistor comprising a semi-conductive body of N-type germanium.

Transistors generally comprise at least three electrodes, two of which, the emitter and the collector, constitute rectifying connections to the semi-conductive body, and the third of which, the base, constitutes an ohmic connection to the body. The invention is concerned with those transistors wherein at least the emitter is constituted of an alloy containing one or more of the following metals; bismuth, indium, lead, thallium and/or tin; and, if desired, in addition some germanium. A very frequently used method for making the emitter and the collector, known as the alloying method, consists in fusing to the N-type semi-conductive body a small quantity of an alloy containing an acceptor impurity, i.e., an element producing acceptors in the semi-conductive body, so that at the fused area a regrown semi-conductive region or layer of P-type conductivity can be produced.

It should be noted that where reference is made to an emitter, this is to be understood to mean the part of the electrode which is made from an aloy and which gives rise to the production of the regrown P-type layer or emitter region during fusion and which absorbs at most a small quantity of germanium during this production. Within the scope of the invention, it is possible to remove for the major part of the alloy formed on the regrown P-type layer after it has been produced and to replace it by a different contact metal, which will, in general, not affect the properties of the resultant transistor. The important consideration is the composition of the alloy producing the P-type layer, and not that of a subsequently-added contact.

When using such a transistor, the emitter is, in general, biased in the forward direction and the collector in the blocking or reverse direction. In a circuit arrangement frequently employed, the "grounded emitter arrangement," in which the emitter constitutes the electrode common to the input and the output circuits, the current amplification factor $\alpha'$, also indicated by $\alpha_{cb}$, is an important parameter. This factor denotes the relationship between the collector current and the base current:

$$\alpha'=\alpha_{cb}=\left(\frac{\partial I_c}{\partial I_b}\right)V_{ce}=\text{constant}$$

wherein $I_c$ and $I_b$ designate the collector current and the current through the base contact, respectively, and $V_{ce}$ designates the voltage between the emitter and the collector. With many transistors operated in this arrangement, there exists the disadvantage that the factor $\alpha'$ rises to a maximum value with increasing emitter current, and then falls off rapidly, which is, of course, disadvantageous particularly with high power transistors.

The chief object of the invention is to obviate this disadvantage.

The invention is based on the realization that an excessively low value of the current gain factor $\alpha'$ and its decrease with higher currents in the known transistors are to be ascribed for a large part to inadequate emitter output, i.e. an excessively small ratio between the whole current introduced into the base and the total emitter current which is known as low emitter efficiency. This is overcome in accordance with the invention by forming the alloy referred to above and constituting the material for the emitter with not more than 25% of one or more of those chemical elements having an atomic number of less than 48 and exhibiting an $S^2P'$ configuration of its outer electrons, i.e. aluminum, boron and gallium. In other words, the emitter alloy will be constituted by not more than 25% by weight of addition elements Al, B, and/or Ga, and the remainder of one or more of the metals Bi, In, Pb, Tl, and/or Sn, and possibly Ge. In many cases, a materially lower content of the addition elements is capable of producing the desired effect, for example, a content of 5% or even 1% or less.

It has furthermore been found that the properties of such a transistor may be further improved by providing a very low specific resistance for the semi-conductive germanium body. According to a preferred embodiment of the invention, the specific resistance or resistivity of the Ge body is less than 0.2 ohm-cm., and preferably even less than 0.1 ohm-cm.

A further embodiment is based on the observation that when fusing the alloy of the invention to a semi-conductive body in the conventional alloying method, the boundary surface or junction between the resultant electrode and the semi-conductive body, aside from the edges, has a flatter shape than with electrodes made without the addition elements. From an electrical point of view, such a junction shape is more favorable than a curved shape. In order to further utilize this improvement, the collector is positioned in the conventional way opposite to the emitter of the invention and to the collector is also added not more than 25% of one or more of the elements having an atomic number of less than 48 and an $S^2P'$ configuration of its outer electrons. By using this improvement, transistors may be obtained in which the emitter junction and the collector junction are spaced apart from one another by a very small, constant distance over a comparatively large area.

A further embodiment of the invention is based on the realization that the usefulness of an emitter having such a high output or efficiency becomes particularly manifest where the conductivity of the substratum of semi-conductive material is not constant, i.e., it exhibits a gradient. Transistors of such construction have been given the appellation of "drift transistors" and are described in an article by H. Krömer in "Die Naturwissenschaften," 40 (1953), pages 578 to 579. In this embodiment, the semi-conductive material between the emitter and the collector exhibits a conductivity which decreases in the direction of the collector. The specific resistance of this material adjoining the emitter is preferably not more than 0.2 ohm-cm.

The usefulness of an emitter having such a high output becomes also particularly manifest in a transistor construction where the substratum of semi-conductive material of the N-type is separated from the collector by a zone of intrinsic semi-conductive material. Transistors in which such an intrinsic intermediate layer is provided have been referred to as "p-n-i-p transistors," and are described by J. M. Early in "The Bell System Technical Journal," 33 (1954), pages 517 to 533. According to a further aspect of the invention, the semi-conductive material of the N-type, on which the emitter of the invention is provided, is separated from the collector by an intrinsic zone. The specific resistance of the N-type semi-conductive material is preferably not more than 0.2 ohm-cm. and even less than 0.07 ohm-cm.

The invention will now be described more fully with reference to the accompanying drawing, wherein.

Figures 1, 2, 3, 4:
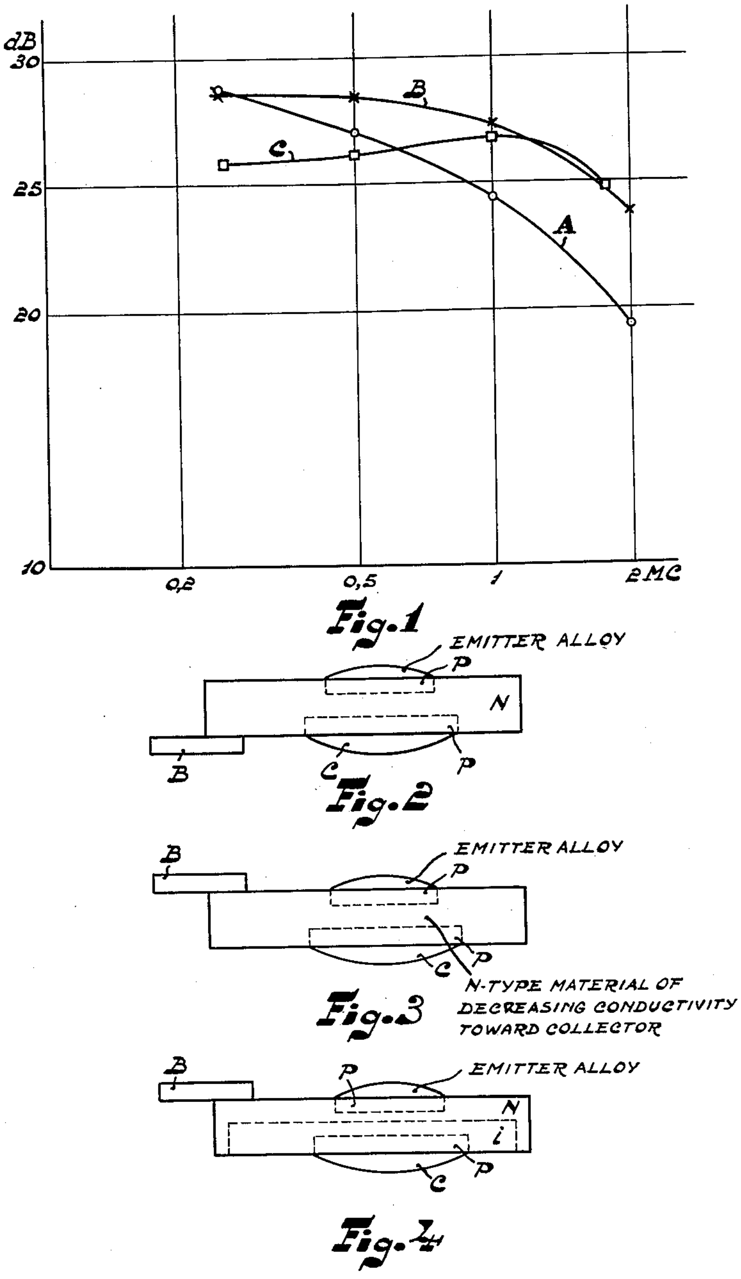
FIG. 1 is a graph illustrating the amplification or power gain of a transistor as a function of frequency.
FIGS. 2, 3 and 4 show in cross-section, respectively, a junction transistor, a "drift" transistor and a "p-n-i-p" transistor in accordance with the invention.

The transistor may be produced on a disc or wafer of an N-type germanium monocrystal having a specific resistance of 3 ohm-cm. and dimensions of 2 x 3 mms. and of 0.1 mm. in thickness. Opposite one another, to the two largest side surfaces, are fused the emitter and the collector alloys. The emitter is as a rule slightly smaller than the collector. On the side of the monocrystal is provided an ohmic base contact by means of tin solder. This results in the usual P-N-P junction transistor.

With an alloy chosen for the emitter which contains 1% by weight of gallium and the remainder indium, in accordance with the invention, and with the collector made, as usual, of indium alone, it was found that the current amplification factor $\alpha'$, at an emitter current of 1A. had a value of 35; whereas a transistor having an emitter of pure indium and being otherwise identical with the former, for comparison purposes, had a current amplification factor $\alpha'$ which fell to 20 at an emitter current of only 150 ma. The former transistor of the invention, on the other hand, had a current amplification factor of 50 at an emitter current of 100 ma. Hence, by means of the invention, it was found that $\alpha'$ did not fall off at high emitter currents but remained uniformly high, effecting an important improvement in the operating characteristics of such transistors.

Further examples of satisfactory compositions of the emitter alloy suitable for the production of the emitter regrown region, all in weight percent, are:

| | Bi | Ge | In | Pb | Tl | Sn | Addition elements | | |
|---|---|---|---|---|---|---|---|---|---|
| | | | | | | | Al | B | Ga |
| 1 | | | 99 | | | | ½ | | ½ |
| 2 | | | 99 | | | | 1 | | |
| 3 | | | 95 | | | | | | 5 |
| 4 | | | 95 | | | | 2½ | | 2½ |
| 5 | | 5 | 94½ | | | | | ½ | |
| 6 | 99 | | | | | | 1 | | |
| 7 | | | | | 98 | | | | 2 |
| 8 | | 3 | | 96 | | | 1 | | |
| 9 | | | | | | 99½ | ½ | | |
| 10 | 10 | 3 | | 60 | | 26 | | | ½ |
| 11 | | 5 | 94 | | | | | | 1 |
| 12 | | | 99.9 | | | | 0.1 | | |
| 13 | | 5 | 94.8 | | | | | | 0.2 |

The aforesaid data relate to the composition of the emitter alloy in percent by weight prior to fusion or melting down. The variation in the composition subsequent to melting down is very slight. In general, a small quantity of germanium will be absorbed from the semi-conductive body. It has been found possible to use a comparatively high content of Ga. However, if the Al content is increased to too high a value, it is found difficult to obtain satisfactory adhesion of the melted alloy to the semi-conductive body. It is therefore advisable to use a lower Al content.

In carrying out the invention, the alloy may be prepared beforehand by mixing and melting together the desired constituents. For example, for making the alloy 99% In and 1% Ga, the two constituents in the proper mixture are simply heated to about 160° C. for about ¼ of an hour in vacuum, and then simply allowed to cool to room temperature. Thereafter, a small amount of this alloy, to serve as the emitter, is placed on top of an etched surface, etched with, for example, a mixture of $HNO_3$ and HF, of the N-type germanium single-crystal body having a specific resistance of 3 ohm-cm.; the body with the alloy placed in an oven and heated to about 500° C. in a $H_2$ atmosphere to cause the alloy to stick to the body. Then, the collector alloy and base contacts are placed on the other side. The body is then heated and maintained at a temperature of about 500–520° C. in the same atmosphere for about 10 minutes, during which time the emitter and collector alloys fuse to the germanium body, after which it is removed from the oven and allowed to cool to room temperature. Thereafter, terminal connections are made to the base, emitter and collector, and the completed body mounted in a suitable housing. The resultant structure, which is the conventional P-N-P junction transistor, is illustrated in FIG. 2.

The production of the P-type layers in the N-type body by this alloy technique, it will be observed, is quite conventional in that the same temperatures, atmospheres and time of heating as that usually employed in this field are used. The unusual advantages obtained with the transistor of the invention stem not from the steps of its preparation, but from the composition of the emitter alloy employed in producing the P-N junction in the germanium body.

Preferred emitter alloys of the invention are as follows:

A 0.05–5% of Ga, and the remainder In.
B ½–1% of Al, 1–10% of Ga, and the remainder In.
C .5–5% of Al, and the remainder Bi.
D .5–10% of Ga, and the remainder Tl.
E .5–5% of Al, 1–10% of Ge, and the remainder Pb.
F .5–8% of Al, and the remainder Sn.
G .5–5% of Ga, 1–10% of Ge, and the remainder In.

In addition to the elements listed above, the emitter alloy of the invention may contain, in general, other elements of a neutral or inert, i.e., non-doping, character. However, the desired characteristics of the invention are imparted, essentially, by the combination of at least one of the metals Bi, In, Pb, Tl and/or Sn together with B, Al or Ga in the ranges specified.

In the aforedescribed case the germanium body exhibited a very conventional value of resistivity, i.e. 3 ohm-cm. It is known, in general, that the gain of a transistor decreases at the higher frequencies due to a filter effect in the input circuit constituted by the emitter and the base, in which circuit the resistance between the base connection and the surroundings of the active blocking layer or barrier affects adversely the emitter. Attempts have therefore been made to decrease the specific resistance of the material of the semi-conductive body. Low values may be considered to be those mentioned in the article of Müller and Pankove in P.I.R.E., 42 (1954), 2 (February), pages 386 et seq., i.e., values of 0.6 to 0.8 ohm-cm. (page 388, left-hand column). At a further decrease of the specific resistance, the amplification factor $\alpha_{c.e.}$ of the transistor drops excessively, presumably due to an excess decrease in the minority charge carriers injected by the emitter region with respect to the total current (the amplification factor $\alpha_{c.e.}$ is to be understood to mean the quotient of the variation in collector current and the variation in emitter current at a constant voltage).

It has now been found that with the high-output emitters used in the transistors of the invention described above, substantially no decrease in the amplification factor at a very low specific resistance of the semi-conductive body occurs. It is therefore possible to obtain adequate amplification with the transistors according to the invention at very high frequencies; it has been found of particular advantage that the variation of the amplification with frequency at least to a given, comparatively high limit, is very small.

This is illustrated in the graph of FIG. 1, in which the power gain in db is plotted on the ordinate and the operating frequency in mc./s. is plotted on the abscissa. The points plotted were all obtained from measurements on transistor with an emitter of indium with ½% of gallium in accordance with the invention. The curve A was obtained with a transistor in which the semi-conductive body is made of germanium having a specific resistance of 0.82 ohm-cm. It is clearly evident that the amplification decreases rapidly with an increase in frequency. The curve B was obtained from a germanium transistor having a specific resistance of 0.2 ohm-cm. The frequency dependence is in this case considerably smaller. Note further that due to the high output emitter of the invention, the amplification is not reduced.

Finally, the curve C was obtained with a germanium transistor having a specific resistance of 0.05 ohm-cm. The frequency dependence was in this case still lower than with the curve B. Moreover, only a small reduction in amplification resulted.

In manufacturing a "drift" transistor in which the semi-conductive material between the emitter and the collector exhibits a graded, decreasing conductivity in the direction of the collector, a disc of germanium of the N-type may be used as starting material, this disc being cut from a monocrystal having a specific resistance of 50 ohm-cm. This disc may be subjected on all sides to phosphorus vapor. Due to diffusion of the phosphorus atoms, the specific resistance of the crystal is reduced, to a greater extent at the surface. The treatment should be terminated before the interior of the crystal has been affected by the diffusion. The diffusion should be carried out in a manner such that the specific resistance of the crystal at the surface is reduced to about 0.1 ohm-cm. Then the crystal can be ground off on one side until about half of the initial thickness is left. The conductivity of this part then exhibits the desired gradient. To the unground side can be fused an emitter of the invention having one of the compositions indicated in the foregoing table in a similar manner to that described in connection with the transistor construction illustrated in FIG. 2. The collector is fused to the ground side, and may be made also from one of these alloys in the table. As an alternative, however, it may be made from other suitable material, for example, pure indium. Such embodiments, one of which is illustrated in FIG. 3, have the advantage that they enable the obtention of a particularly strong gradient in the conductivity, while, at the same time, sufficient emitter injection is present due to the emitter alloy of the invention.

A further preferred embodiment, in which the semi-conductive material of the N-type on which the emitter is provided is separated from the collector by an intrinsic zone, may be manufactured in a similar manner by exposing the surface of an intrinsic germanium disc to arsenic vapor in a manner such that a layer of semi-conductive material of the N-type is produced having a specific resistance of 0.05 ohm-cm. On this low resistance layer is melted down the emitter composed of one of the alloys indicated in the foregoing table. One surface of the disc is ground off to expose intrinsic material, and the collector is applied thereto, thus forming locally a P-type semi-conductor, which collector may be made from one of the aforesaid alloys or from a single acceptor, for example, pure indium. This construction is illustrated in FIG. 4.

The advantage of this embodiment is that it enables the provision of a very high conductivity for the N-type layer, so that a low base resistance is obtained, whereas adequate emitter injection obtains by reason of the new emitter of the invention. Moreover, due to the intrinsic layer, the break-down voltage of the collector is high and the capacitance of the collector is low.

Reference is made to our earlier copending application, Serial No. 489,644, filed February 21, 1955, which claims related subject matter, of which the present application is a continuation-in-part.

While we have described our invention in connection with specific embodiments and applications, other modifications thereof will be readily apparent to those skilled in this art without departing from the spirit and scope of the invention as defined in the appended claims.

What is claimed is:

1. A transistor comprising a germanium body having an N-type conductivity portion, and an emitter alloy fused to and alloyed with said body at said N-type portion and producing a high-injection-efficiency emitter electrode therein, said emitter alloy consisting essentially of a principal constituent selected from the group consisting of indium, bismuth, lead, thallium and tin, and of more than zero and less than 0.1% of at least one additive selected from the group consisting of aluminum, gallium and boron, and collector and base electrodes connected to said germanium body, said N-type conductivity portion having a region adjacent the emitter possessing a resistivity of less than 0.07 ohm-cm.

2. A high-frequency transistor comprising a semi-conductive germanium body comprising a p-type collector region and low-resistive n-type base and p-type emitter regions cooperating to produce a high-efficiency, emitter, alloy junction, said n-type base region having a portion adjacent the emitter region whose resistivity is below 0.1 ohm-cm., said p-type emitter region having been produced by fusing to said body a solid metal alloy mass consisting essentially of indium and more than zero but less than 1% by weight of gallium, and separate electrical contacts to said n-type and two p-type regions.

3. A high-frequency transistor comprising a body of germanium semi-conductive material comprising a p-type collector region and a low-resistive n-type base region, and a rectifying electrode surface alloyed to the body to produce a p-type emitter region, the portion of said n-type base region adjacent said emitter region having a resistivity below 0.1 ohm-cm., said rectifying electrode consisting principally of indium alloyed with 0.05% to less than 1% by weight of gallium.

4. A transistor comprising an N-type germanium body portion whose resistivity is below 0.1 ohm-cm. and having a high-efficiency emitter alloy electrode forming a rectifying connection with said body portion, said emitter being constituted of a metal alloy consisting essentially of bismuth and between 0.5 and 5% by weight of aluminum.

5. A transistor comprising a germanium body having an N-type conductivity portion whose resistivity is below 0.1 ohm-cm., and an emitter-forming alloy fused to and alloyed with said body at said N-type portion and producing a high-injection-efficiency P-N emitter junction therein, said emitter alloy consisting essentially of lead and 0.5 to 5% by weight of aluminum.

6. A semiconductor device comprising a semiconductive body of germanium containing an N-type region, and an electrode surface alloyed to said N-type region at a portion thereof whose resistivity is below 0.07 ohm-cm., said electrode consisting essentially of an alloy of indium and 0.1% of aluminum.

7. A high frequency transistor comprising a germanium body having an N-type conductivity base region, and an emitter-forming alloy fused to and alloyed with said body at said N-type region and producing a high-injection-efficiency P-N emitter junction therein, said base region having a portion adjacent the junction whose resistivity is below 0.1 ohm-cm., said emitter alloy consisting essentially of bismuth, and more than zero but less than 25% of at least one addition constituent selected from the group consisting of aluminum, boron and gallium.

8. A high frequency transistor comprising a germanium body having an N-type conductivity base region, and an emitter-forming alloy fused to and alloyed with said body at said N-type region and producing a high-injection-efficiency P-N emitter junction therein, said base region having a portion adjacent the junction whose resistivity is below 0.1 ohm-cm., said emitter alloy consisting essentially of lead, and more than zero but less than 25% of at least one addition constituent selected from the group consisting of aluminum, boron and gallium.

9. A high frequency transistor comprising a germanium body having an N-type conductivity base region, and a metal mass fused to and alloyed with said body and producing a P-type emitter region therein and a high-injection-efficiency P-N emitter junction, said base region having a portion adjacent the junction whose resistivity is below 0.07 ohm-cm., said mass containing as a principal constituent at least one element selected from the group consisting of indium, bismuth, lead, thallium and tin, and as an essential additive more than zero but less than 0.1% of at least one element selected from the group consisting of aluminum, gallium and boron, separate electrical connections to said base region and said mass, and a collector connection to said body.

References Cited in the file of this patent

UNITED STATES PATENTS

| | | |
|---|---|---|
| 2,781,480 | Mueller | Feb. 12, 1957 |
| 2,784,300 | Zuk | Mar. 5, 1957 |
| 2,802,159 | Stump | Aug. 6, 1957 |
| 2,836,522 | Mueller | May 22, 1958 |

UNITED STATES PATENT OFFICE
CERTIFICATE OF CORRECTION

Patent No. 3,078,195 February 19, 1963

Leonard Johan Tummers et al.

It is hereby certified that error appears in the above numbered patent requiring correction and that the said Letters Patent should read as corrected below.

Column 1, line 32, for "aloy" read -- alloy --; line 37, for "part of the" read -- part the --.

Signed and sealed this 8th day of October 1963.

:EAL)
ıttest:

RNEST W. SWIDER
ıttesting Officer

EDWIN L. REYNOLDS
Acting ommissioner of Patents